United States Patent
Lai et al.

(10) Patent No.: US 7,230,538 B2
(45) Date of Patent: Jun. 12, 2007

(54) APPARATUS AND METHOD FOR IDENTIFYING SURROUNDING ENVIRONMENT BY MEANS OF IMAGE PROCESSING AND FOR OUTPUTTING THE RESULTS

(75) Inventors: Chin Lun Lai, Pan-Chiao (TW); Yiu-Tong Chu, Taipei (TW)

(73) Assignees: Oriental Institute of Technology, Pan-Chiao (TW); Far Eastern Memorial Hospital, Pan-Chiao (TW)

( * ) Notice: Subject to any disclaimer, the term of this patent is extended or adjusted under 35 U.S.C. 154(b) by 139 days.

(21) Appl. No.: 10/928,423

(22) Filed: Aug. 27, 2004

(65) Prior Publication Data

US 2005/0275718 A1 Dec. 15, 2005

(30) Foreign Application Priority Data

Jun. 11, 2004 (TW) ................ 93116990 A

(51) Int. Cl.
*G08B 23/00* (2006.01)
(52) U.S. Cl. .................. 340/573.1; 340/825.19; 340/407.1; 348/61; 348/62; 382/114
(58) Field of Classification Search ............. 340/573.1
See application file for complete search history.

(56) References Cited

U.S. PATENT DOCUMENTS

| 3,369,228 | A | * | 2/1968 | Foster | 340/573.1 |
|---|---|---|---|---|---|
| 5,803,740 | A | * | 9/1998 | Gesink et al. | 434/112 |
| 6,055,048 | A | * | 4/2000 | Langevin et al. | 356/237.1 |
| 6,115,482 | A | * | 9/2000 | Sears et al. | 348/62 |
| 6,504,942 | B1 | * | 1/2003 | Hong et al. | 382/103 |
| 6,608,941 | B1 | * | 8/2003 | Suzuki et al. | 382/272 |
| 6,828,918 | B2 | * | 12/2004 | Bowman et al. | 340/825.19 |
| 6,885,771 | B2 | * | 4/2005 | Takahashi | 382/199 |
| 6,901,163 | B1 | * | 5/2005 | Pearce et al. | 382/165 |
| 6,944,331 | B2 | * | 9/2005 | Schmidt et al. | 382/165 |
| 7,035,461 | B2 | * | 4/2006 | Luo et al. | 382/167 |
| 7,068,814 | B2 | * | 6/2006 | You et al. | 382/103 |
| 7,127,108 | B2 | * | 10/2006 | Kinjo et al. | 382/203 |
| 2003/0012435 | A1 | * | 1/2003 | Forde | 382/167 |
| 2003/0026461 | A1 | * | 2/2003 | Arthur Hunter | 382/114 |
| 2003/0048928 | A1 | * | 3/2003 | Yavitz | 340/825.19 |
| 2003/0095140 | A1 | * | 5/2003 | Keaton et al. | 345/700 |

(Continued)

FOREIGN PATENT DOCUMENTS

EP 1 391 845 A2 2/2004

(Continued)

*Primary Examiner*—Daniel Wu
*Assistant Examiner*—Eric M. Blount
(74) *Attorney, Agent, or Firm*—Christensen O'Connor Johnson Kindness PLLC

(57) ABSTRACT

The present invention relates to an apparatus for identifying surrounding environment by means of image processing, so as to be used by blind people or unmanned vehicles. The said apparatus comprises an input device, which includes at least one CCD or CMOS means for capturing images, a processing device, which could be a micro processing unit such as a notebook computer, DSP or other embedded system, and an output device, such as a speech earphone. The processing device applies hue analysis and geometric analysis to identify traffic signals and markings.

5 Claims, 3 Drawing Sheets

U.S. PATENT DOCUMENTS

2004/0086153 A1* 5/2004 Tsai et al. .................... 382/104
2005/0007449 A1* 1/2005 Ikado .......................... 348/62
2005/0232481 A1* 10/2005 Wu ............................. 382/167
2006/0011718 A1* 1/2006 Kurzweil et al. ............ 235/379
2006/0098089 A1* 5/2006 Sofer ........................... 348/62

FOREIGN PATENT DOCUMENTS

| TW | 518965 | 1/2003 |
| TW | 563525 | 11/2003 |

* cited by examiner

APPARATUS AND METHOD FOR IDENTIFYING SURROUNDING ENVIRONMENT BY MEANS OF IMAGE PROCESSING AND FOR OUTPUTTING THE RESULTS

BACKGROUND OF THE INVENTION (A) Field of the Invention

This invention relates to an electronic apparatus, more specifically, to an electronic apparatus identifying surrounding environment by means of image processing and outputting the result for use by the blind people.

(B) Description of Related Art

The welfare of handicapped people has become a major focus in the modern society. For example, many apparatuses and facilities used by the blind people, such as guide stick, guide dog, or acoustic alarm set at busy intersections, have been invented and made it much easier for the blind people to walk around. However, each of the above mentioned apparatuses and facilities has different drawbacks. Conventional guide stick can only detect ground condition in front of the user but cannot provide information in a range. Guide dog cannot "tell" the user what is happening in front of him/her so as to prepare in advance. Moreover, the cost to train and maintain a guide dog is relatively high so that it is not affordable for many people. As for preset landmarks, such as acoustic alarm and speech guide, only installing them at a few intersections is useless, as all intersections must be rebuilt to include the preset landmarks, which will result in high cost.

Because of advances of electronic technology, many patents focus on improvements of conventional blind guiding apparatuses, such as Taiwan Patent Publication No. 563525, entitled "Traffic Guiding Apparatus for Blind people." Tactile tiles for guiding blind people in intersections are magnetizable and the magnetism can be "activated" when the traffic light is red so as to attract special guide stick and shoes and notify the user of the red traffic signal ahead. However, besides the fact that all blind people must wear special shoes or use special guide sticks, it still has the disadvantage of "landmarks" aforementioned.

Taiwan Patent Publication No. 518965, entitled "Speech Guide Glasses", disclosed glasses comprising a sensor and a speech earphone. The sensor has two functions. The first function is to sense the color of traffic light in front of the user and notify the user. The second function is to detect obstacles ahead by receiving reflected IR beam sent out by the sensor. The information is then output by the earphone. After a brief review, we are of the opinion that this invention has the following suspicious points:

1. This invention utilizes RGB filter to process the received light prior to recognizing traffic light. However, it should be understood that all visible light could be decomposed into RGB primary colors. If the recognition of traffic light is based on the images after RGB filtering, we can predict that the data flow for recognition will be enormously large, which is not a good technical solution for traffic light recognition.
2. Even if computer can process such an enormous data flow real-time, it is still a fact that the result of RGB filtering changes with environmental light condition. Therefore, the analyzing result based on RGB filtering will not be accurate.
3. The invention can only detect traffic lights and obstacles in front of the user but has nothing to do with flat marks and lines on the street. However, as we can see in everyday life, flat marks and lines are frequently used for providing information and guidance.

The inventor of the present application is familiar with pattern recognition and computer vision. Based on his specialty, the present invention is a practical solution for the disadvantages of prior art aforementioned.

SUMMARY OF THE INVENTION

The apparatus of the present invention comprises three parts as shown in FIG. 1. The first part is an input device composed by at least one CMOS (Complementary Metal-Oxide Semiconductor) or CCD (Charge-Coupled Device) means. The second part is a processing device, which can be constituted by a mobile computer system such as a PDA or a laptop computer, or an embedded system such as Digital Signal Processor(DSP) or micro-controller system. The third part is an output device such as a speech outputting device or a tactual outputting device.

The input device mainly comprises the said CMOS or CCD photographing means capturing color images and transmitting the images to the processing device for pattern recognition. The input device could comprise additional active detecting means such as IR or radar detecting means so as to improve functionality of the system.

The processing device transforms the color images transmitted from the input device into HSV (hue/saturation/value) format first so as to adapt to the variety of ambient light condition. In the transformed images, areas with hue value close to traffic lights and consecutive to each other are marked. The transformation is already prior art, for instance, well-known commercial software "Photoshop" containing similar functions.

After abovementioned transformations, more judging conditions are considered. Do the colors change in a reasonable time interval and within a limited area? Is there any other auxiliary signal (such as the red standing figure indicating "stop") existing? Is the "area" in a round shape (or other possible shapes of traffic lights; this kind of pattern recognition is prior art)? Following this procedure, it is possible to mark areas of traffic lights.

Besides the function of determining the existence of traffic lights, the processing device can determine the existence of traffic markings according to the images captured by the input device. Traffic markings are regular patterns, so that recognizing the length, width and direction of which is easy by utilizing hue and geometry detecting techniques.

In addition to basic functions aforementioned, it is possible to determine if fixed or moving obstacles exist in the images taken by the input device by binocular vision analysis or image differential analysis.

Moreover, texture analysis, frequency analysis, or data taken by active sensor included in the input device could provide more information of surrounding environment. The technique of analyzing obstacles in images taken by a moving platform by utilizing image differential analysis has been disclosed by EP 1,391,845, entitled "Image Based Object Detection Apparatus and Method."

The processing device can further determine the horizon by analyzing hue and geometry of lines information in images taken. After horizon is determined, the processing device could either actuate the input device to adjust the viewing angle, or notify the user to adjust the viewing angle by outputting a signal to the output device.

Finally, the processing device could include a system setup mode. In this mode, the user could adjust system settings as well as "educate" the system so as to make the accuracy of recognition higher. The method to enter the system setup mode could be done by physical access to the processing device (by keyboard, for instance), or more cleverly, by inputting predetermined signal into the input device, for instance, a special designed gesture in front of the input device.

The output device outputs a speech or tactual notification to the user in accordance to the environmental situation determined by the processing device.

In view of above, the advantages of the present invention are:
1. In the past, most blind guiding apparatuses are based on active detecting means, which result in higher electricity consumption, higher cost, lower determination resolution, and lack of the capability to detect markings. The present invention solves all the problems by means of image processing.
2. The present invention could additionally include an active detecting means so as to satisfy more strict needs.
3. The input device could include the function of film recording, which provides a continuous, full understanding of the environment as well as an opportunity of self-educating for the system.
4. Lower cost.
5. Besides the functionality of blind guidance, the present invention could also be used in self-guidance of unmanned vehicles, especially in factories, where the environment within is simpler than streets and maintaining the simplicity is easier.

DETAILED DESCRIPTION OF THE INVENTION

Figure 1:
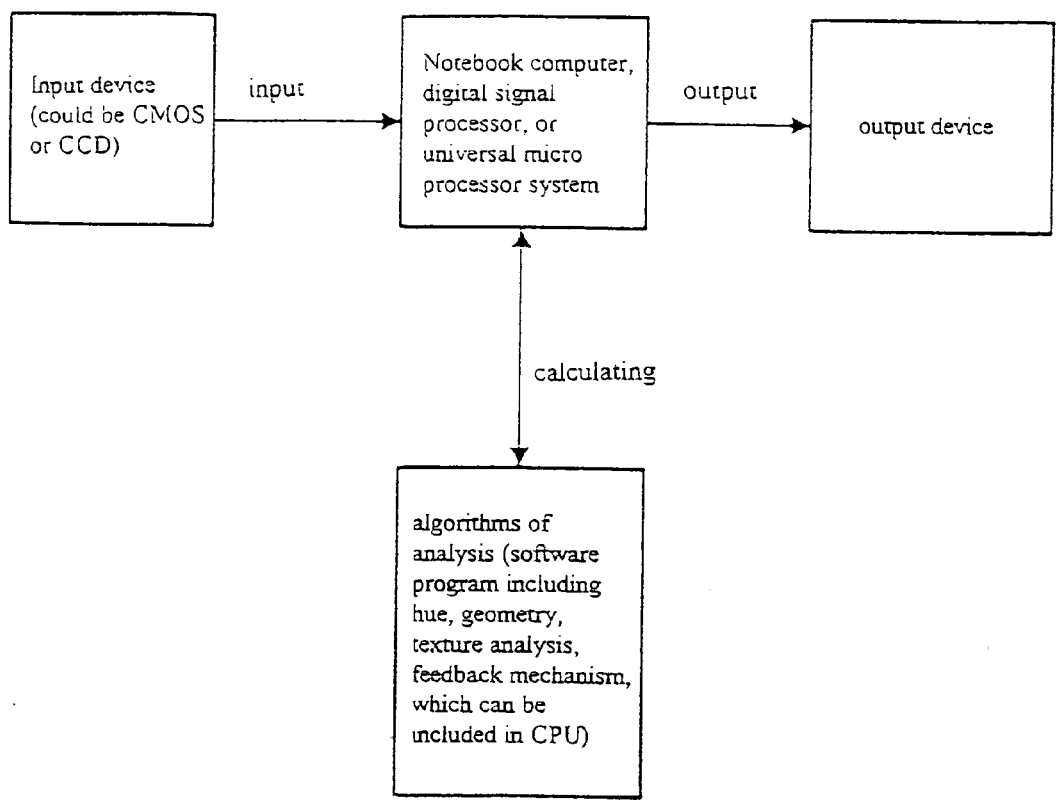
FIG. 1 is a diagram showing the composition of the apparatus according to the present invention.
Figure 2:
FIG. 2 is an outside view of the apparatus according to one embodiment of the present invention.
Figure 3:
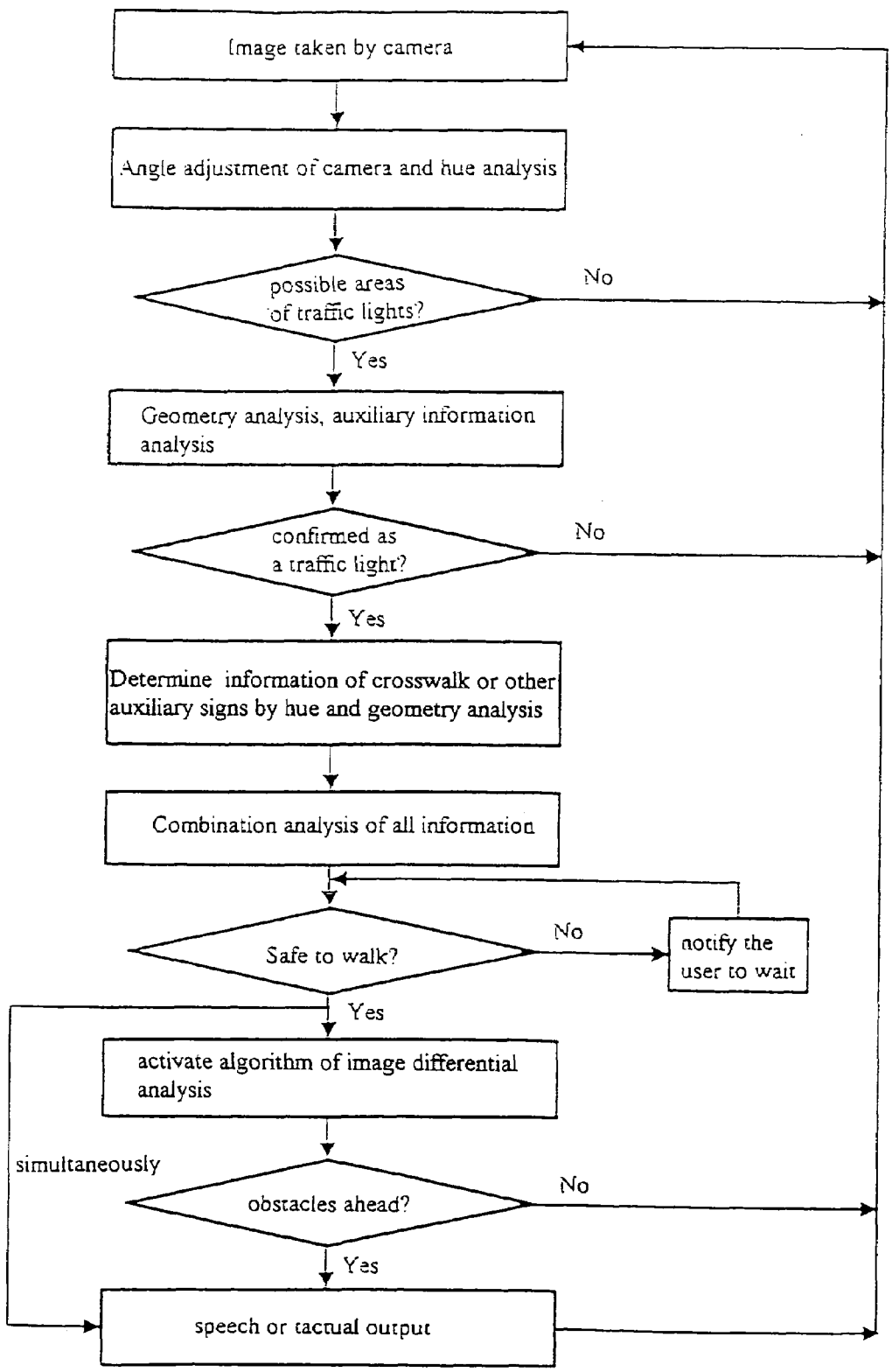
FIG. 3 is the flow chart of procedure taken by the processing device according to one embodiment of the present invention.

Please refer to FIG. 2 and FIG. 3 for operation procedure and structure of one embodiment of the present invention. The embodiment only illustrates the present invention in a simple manner so as to make the invention easier to understand. The protection scope of the present invention should not be limited to what the embodiment discloses. Anyone who is familiar with the technique could make modifications or change the details in accordance with the present invention without departing from the technological ideas and spirit of the invention.

The embodiment includes a micro camera 1 which is composed by CCD or CMOS means, a micro processor system 2 (such as a laptop computer or PDA), and a speech earphone 3. The micro camera is worn at steady locations on body, such as chest and head, of the user, and the micro processor system is carried by the user, as shown in FIG. 2.

Please refer to FIG. 3. After the apparatus of the embodiment is turned on, the micro camera 1 starts capturing images and sends the same to the micro processor system 2. The images are then transformed into HSV format. Generally speaking, firstly, the values of R, G, B (red, green, blue) in taken color images are normalized into a value between 0–1. Secondly, hue (H) value is then calculated by the following formula:

$$H_1 = \cos^{-1}[0.5(2R-G-B)/\sqrt{(R-G)^2+(R-B)(G-B)}]$$

$H = H_1$ if $B \leq G$ $H = 360° - H_1$ if $B > G$

Then mark the areas with hue value closing to traffic lights:

If $0 < H < 0.125$, it is recognized as red traffic light. If $0.125 < H < 0.22$, it is recognized as yellow traffic light. If $0.25 < H < 0.45$, it is recognized as green traffic light.

In the mean time, the micro processor system 2 continuously checks if the micro camera 1 is at a right angle of elevation and adjust the angle accordingly.

Subsequently, the micro processor system 2 marks the possible areas of traffic lights, and then combines other auxiliary information, such as geometry shape of the traffic light, existence of auxiliary signs (for instance, red standing figure indicating "stop"), and existence of crosswalk marking (including length, width, direction, etc.), to determine if the possible areas are actually traffic lights. If the marked areas are determined to be traffic lights, the result will be output to the user by the speech earphone 3. The output result includes real-time accessibility of the intersection (i.e. the color of traffic light.) If the intersection is accessible, information of the crosswalk will also be provided. Moreover, the apparatus of the embodiment can determine if obstacles are present by utilizing algorithms such as image differential analysis, and provide the result to the user through the speech earphone 3.

What is claimed is:

1. An electronic apparatus for detecting and determining an environment, comprising:
    an input device comprising at least one CCD or CMOS means for inputting images;
    a processing device comprising a portable embedded processing system; and
    an output device comprising at least one of a speech notification device and a tactual output device,
    wherein the input device detects a surrounding environment and transmits detected information to the processing device for determination, and the determination is provided to the output device, and
    wherein the processing device can determine horizon by analyzing geometry and hue information in images taken by the input devices to determine elevation angle of the input device.

2. The apparatus according to claim 1, wherein the processing device actuates the input device to adjust the elevation angle automatically or actuates the output device to notify the user to adjust the elevation angle by hand.

3. A method for identifying traffic lights comprising the following steps:
    transforming color images taken by an input device into HSV format;
    choosing areas with hue value close to traffic lights and consecutive to each other;
    determining if the areas chosen are in the shape of the traffic lights; and
    checking other auxiliary information including time intervals between each color of a changing light, existence of other auxiliary signals, or both.

4. The method according to claim 3, wherein an identifying operation will restart from the first step if no areas with hue value close to traffic lights are found.

5. The method according to claim 3, wherein an identifying operation will restart from the first step if areas chosen are not in the shape of the traffic lights.

* * * * *